(12) United States Patent
Busch et al.

(10) Patent No.: US 11,578,812 B2
(45) Date of Patent: Feb. 14, 2023

(54) SOLENOID ADAPTER

(71) Applicant: Rain Bird Corporation, Azusa, CA (US)

(72) Inventors: Douglas Scott Busch, Tucson, AZ (US); Peter Smith, Tucson, AZ (US); Leonard Francisco Challenger, Tucson, AZ (US); Riccardo Tresso, Oro Valley, AZ (US); Gokhan Aydar, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 16/723,684

(22) Filed: Dec. 20, 2019

(65) Prior Publication Data
US 2020/0200290 A1    Jun. 25, 2020

Related U.S. Application Data

(60) Provisional application No. 62/784,269, filed on Dec. 21, 2018.

(51) Int. Cl.
*F16K 31/05* (2006.01)
*F16K 27/02* (2006.01)

(52) U.S. Cl.
CPC .................. *F16K 31/05* (2013.01)

(58) Field of Classification Search
CPC ...... F16K 31/05; F16K 35/027; F16K 31/385; F16K 31/402; F16K 27/029; F16K 5/0257; F16K 5/0264; F16K 31/36–42; F16D 41/12; H02K 5/00; H02K 5/04

USPC ................. 251/129.01–129.22, 230
See application file for complete search history.

(56) References Cited

U.S. PATENT DOCUMENTS

| | | | | |
|---|---|---|---|---|
| 802,948 | A | * 10/1905 | Waterman | F16K 31/10 |
| | | | | 251/129.2 |
| 1,765,377 | A | * 6/1930 | Donn | F16K 31/105 |
| | | | | 251/129.2 |
| 3,410,301 | A | 11/1968 | Merriner | |
| 4,662,397 | A | * 5/1987 | Callison | F16K 31/528 |
| | | | | 137/624.14 |
| 5,810,533 | A | * 9/1998 | Nakamura | B24B 23/02 |
| | | | | 411/408 |
| 5,853,026 | A | 12/1998 | Wlodarczyk | |

(Continued)

OTHER PUBLICATIONS

Toro, "Toro Illustrated Parts Breakout Book, Form No. 380-0070 Rev E," 2015, The Toro Company, Bloomington, Minnesota. Retrieved from the Internet <https://cdn2.toro.com/en/-/media/Files/Toro/Page/Parts/irrigation-parts-breakou t-book.ashx>, Cover pages, Contents pages, and Valve Product Drawings showing combination of Valve Handle (Part Nos. (1081051 and 606902) and Bleed Plug (Part Nos. 1025593, 1021197, and 1024787) for ten valves, 26 pages.

(Continued)

*Primary Examiner* — Marina A Tietjen
(74) *Attorney, Agent, or Firm* — Fitch, Even, Tabin & Flannery, LLP

(57) ABSTRACT

An adapter is provided for a solenoid of a valve. The adapter provides a radial seal and enables manually bleeding by rotating the solenoid. The adapter includes two primary components with a one-way locking engagement between them that can be manually reversed for service of the adapter and the solenoid.

6 Claims, 10 Drawing Sheets

(56) References Cited

U.S. PATENT DOCUMENTS

| | | |
|---|---|---|
| 6,263,901 B1 | 7/2001 | Lohde |
| 6,394,126 B2 | 5/2002 | Lohde |
| 6,394,413 B2 | 5/2002 | Lohde |
| 6,488,260 B1 | 12/2002 | Dietz |
| 6,557,580 B2 | 5/2003 | Lohde |
| 6,684,901 B1 | 2/2004 | Cahill |
| 6,974,120 B2 | 12/2005 | Wilson |
| 7,694,934 B2 | 4/2010 | Irwin |
| 7,735,513 B2 | 6/2010 | Bush |
| 7,938,383 B2 | 5/2011 | Zur |
| 8,261,770 B2 | 9/2012 | Bush |
| 8,397,745 B2 * | 3/2013 | Hurst ................ G05D 7/03 137/119.03 |
| 8,413,681 B2 | 4/2013 | Schmuckle |
| 8,695,620 B2 | 4/2014 | Bush |
| 8,740,177 B2 | 6/2014 | Walker |
| 8,881,759 B1 | 11/2014 | Shtekelmacher |
| 10,088,849 B2 | 10/2018 | Hurst |
| 10,815,958 B2 | 10/2020 | Kah, III |
| 2009/0283166 A1 | 11/2009 | Gott |
| 2018/0320792 A1 | 11/2018 | Ross |
| 2020/0200290 A1 | 6/2020 | Busch |

OTHER PUBLICATIONS

Rain Bird Corporation, Adapter 1 publicly available more than a year before the filing date.
Rain Bird Corporation, Adapter 2 publicly available more than a year before the filing date.

* cited by examiner

SOLENOID ADAPTER

CROSS-REFERENCE TO RELATED APPLICATIONS

This application claims the benefit of U.S. Provisional Application No. 62/784,269, filed Dec. 21, 2018, which is incorporated herein by reference in its entirety.

FIELD

The present invention relates to solenoid valves and, more particularly, to manual bleeding of solenoid valve.

BACKGROUND

Solenoid valves are commonly used to control fluid flow through a fluid system, such as an irrigation system. A typical solenoid valve includes an inlet, an outlet and valve seat in between them. A diaphragm engages the valve seat to prevent flow through the valve and is moved off the valve seat to permit flow through the valve. A pressure chamber is located on the side of the diaphragm opposite the valve seat. Fluid from the inlet side of the valve seat flows into the pressure chamber, such as through a hole in the diaphragm. The fluid builds up in the pressure chamber causing the diaphragm to close against the valve seat. To open the valve, the solenoid is energized to open a vent passage from the pressure chamber to the outlet side of the valve seat to release fluid pressure in the pressure chamber so that the inlet pressure of the fluid can raise the diaphragm off the valve seat. To close the valve, the solenoid is deenergized so that the pressure chamber can become pressurized to overcome the inlet pressure, forcing the diaphragm on to the valve seat.

The vent passage includes a valve seat that is opened and closed by a plunger of the solenoid. The valve seat is typically located in a solenoid bowl on the valve. The solenoid bowl includes internal threading that mates with external threading on the solenoid. So, the solenoid is threaded into the solenoid bowl to mount the solenoid.

There are instances where it is desired to manually open the valve, such as, for example, to manually operate the flow system in the event the solenoid has become defective or to clean out the valve. One common method is to unscrew the solenoid to lift the plunger off the valve seat in the solenoid bowl. This opens the vent passage that, in turn, opens the valve as described above.

Some solenoids, however, as designed, are not good candidates for this type of manual operation. For example, there are some solenoids that use a face seal instead of a radial seal. Thus, unscrewing of the solenoid does not immediately create the separation required to internally bleed the pressure chamber. For example, in some solenoids, there is no plunger retainer so the solenoid spring will bias the plunger out further and further as the solenoid is unscrewed. Thus, for manually bleeding, the solenoid will need to be unscrewed to a point where there is no sealing provided to prevent leaking between the solenoid and solenoid bowl (e.g., the face seal is broke).

Further, there is potential for the face seal to be displaced by friction and/or fluid pressure. When attempting to screw the solenoid back in place, a displaced O-ring can be damaged and permanently ruin the seal forcing replacement or resulting in a non-closing valve.

DETAILED DESCRIPTION

Figure 1:
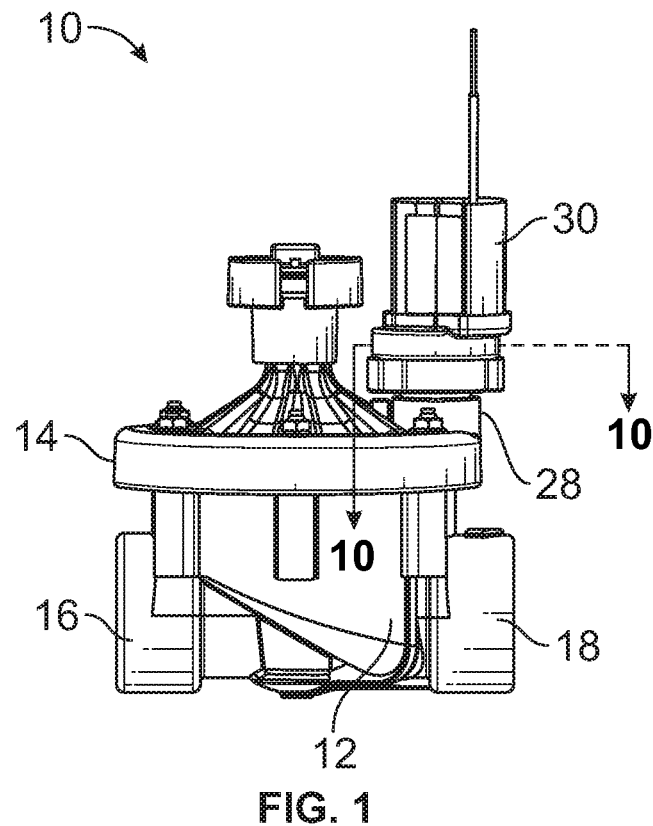
FIG. 1 is a side elevational view of a solenoid valve.
Figure 2:
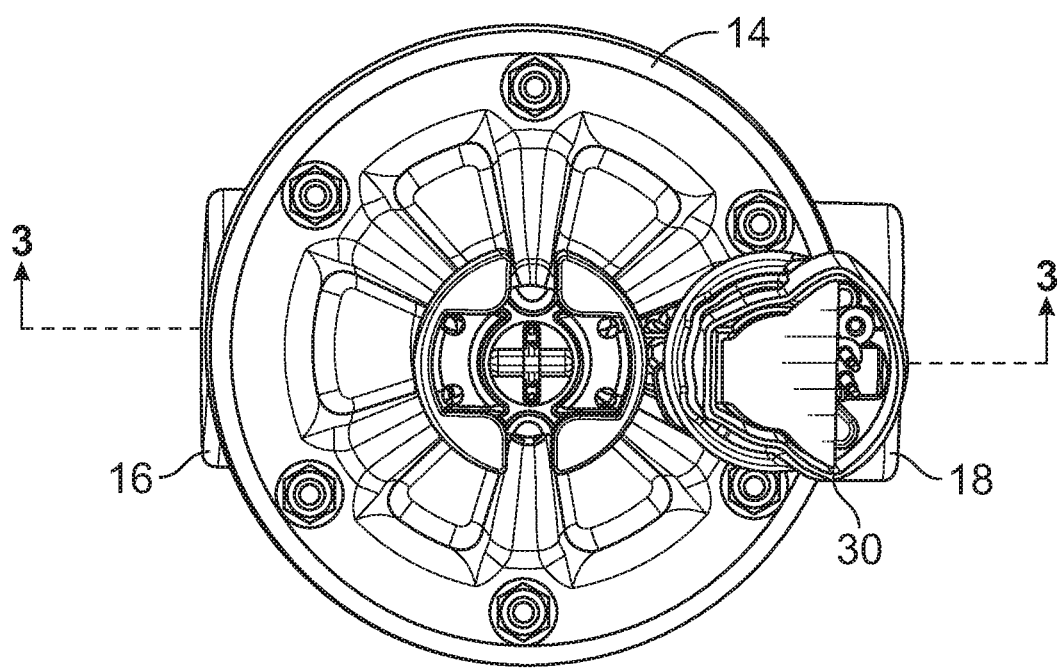
FIG. 2 is a top plan view of the solenoid valve of FIG. 1.

With reference to FIGS. 1-4, there is illustrated a solenoid valve 10. The solenoid valve includes a valve body 12 and a bonnet 14. The valve body 12 includes an inlet 16, an outlet 18, a primary valve seat 20 between the inlet 16 and outlet 18 and a diaphragm 22 that engages the primary valve seat 20 to prevent flow and lifts off the primary valve seat 20 to allow flow. The bonnet 14 and the diaphragm 22 form a pressure chamber 24, and the diaphragm 22 includes a passage 26 for fluid to pass from the inlet side of the diaphragm 22 to the pressure chamber 24.

The bonnet 14 includes a solenoid socket or solenoid bowl 28 to attach a solenoid 30 to the solenoid valve 10. The solenoid 30 controls the opening and closing of the valve 10. A vent passage 32 consists of a first segment 32a that extends from the pressure chamber 24 and a second segment 32b that extends to the outlet side of the valve body 18. There is a secondary valve seat 34 along the vent passage 32 that a plunger 36 of the solenoid 30 opens and closes. In the closed position, the plunger 36 is in engagement with the secondary valve seat 34 and pressure increases in the pressure chamber 24 to force the diaphragm 22 in engagement with the primary valve seat 20 to close the valve 10. In the open position, the plunger 36 is spaced from the secondary valve seat 34 and fluid flows from the pressure chamber 24 to the outlet 18, thereby relieving pressure in the pressure chamber 24 and allowing the pressure of the inlet fluid to move the diaphragm 22 off the primary valve seat 20 to permit flow through the valve 10.

There are instances where it is desired to manually relieve the pressure in the pressure chamber 24 and open the valve 10, allowing fluid flow. In some cases, such as with the solenoid 30, there is a face seal (O-ring 44) with the solenoid 30. It is not recommended to unscrew the solenoid 30 to move the plunger 36 away from the secondary valve seat 34 because the face seal can become displaced and not reseal properly or become damaged when returning the solenoid 30 back to its fully installed position.

To address this, the solenoid 30 is mounted to the solenoid socket 28 of the bonnet 14 with a two-piece adapter 38 having an upper lock ring 40 and a lower base 42. The solenoid 30 interfaces with the base 42 with a face seal (O-ring 44). When the solenoid 30 is unscrewed slightly, the face seal remains intact and the turning force is transferred from the lock ring 40 to the base 42 to disconnect a plunger passage 46 from a secondary inlet 48 to the vent passage 32, thereby opening the vent passage 32 to allow flow through the valve 10. When the solenoid 30 is threaded back into its fully installed position, the plunger passage 46 is reengaged with the secondary inlet 48 requiring the vent passage 32 to be opened at the secondary valve seat 34 by movement of the plunger 36.

Figure 4:
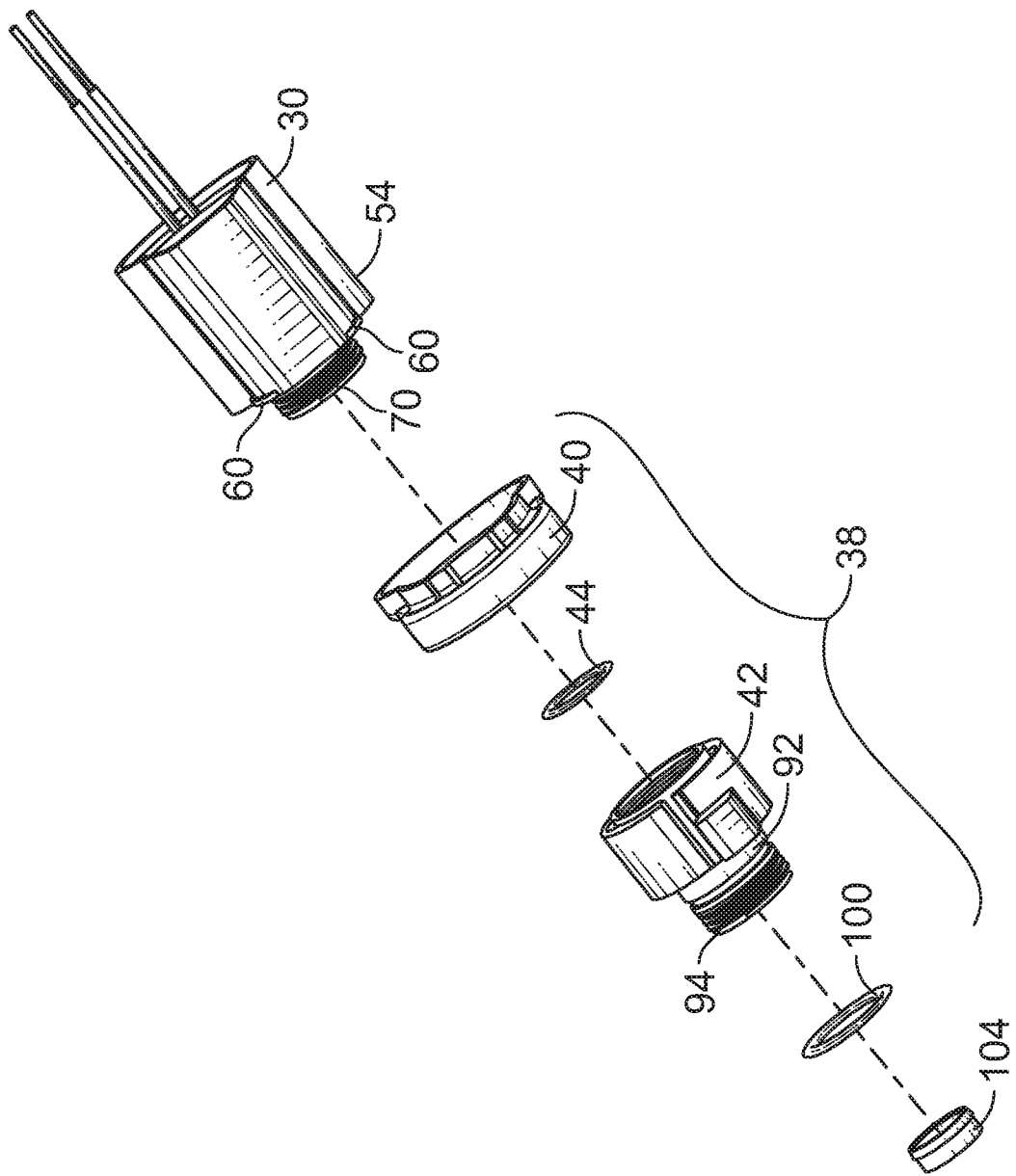
FIG. 4 is an exploded view of an adapter and solenoid of the solenoid valve of FIG. 1.
Figure 5:
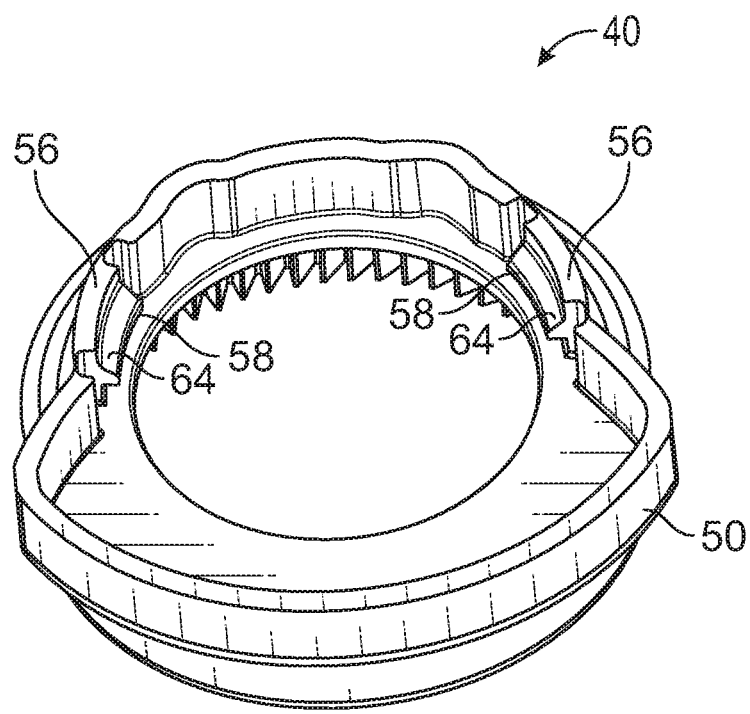
FIG. 5 is a top perspective view of a locking ring of the adapter of the solenoid valve of FIG. 1.
Figure 6:
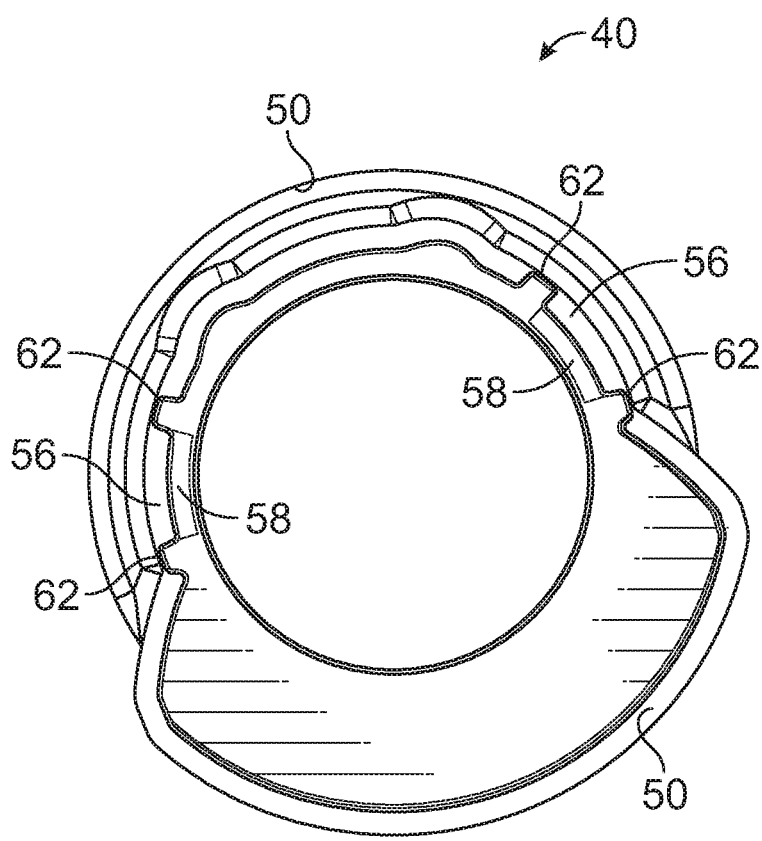
FIG. 6 is a top plan view of the locking ring of FIG. 5.
Figure 7:
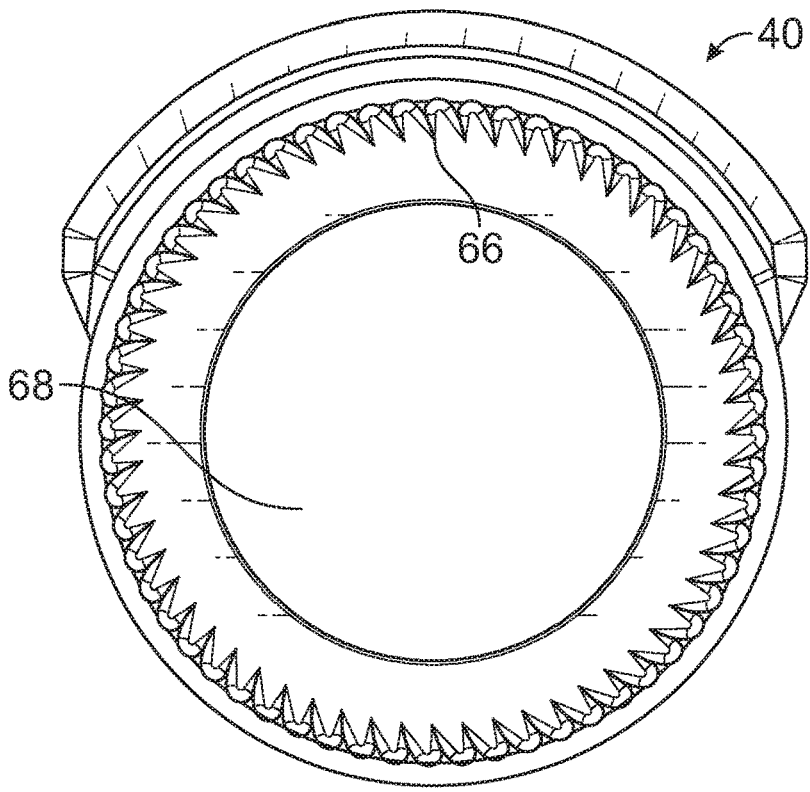
FIG. 7 is a bottom plan view of the locking ring of FIG. 5.
Figure 8:
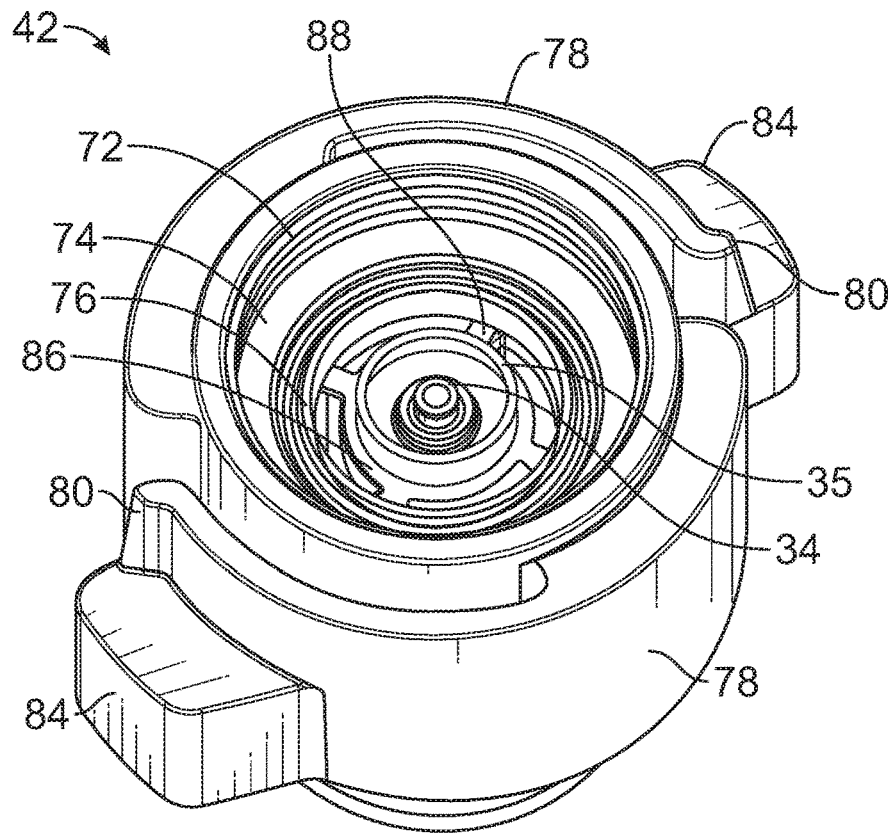
FIG. 8 is a top perspective view of a base of the adapter of the solenoid valve of FIG. 1.
Figure 9:
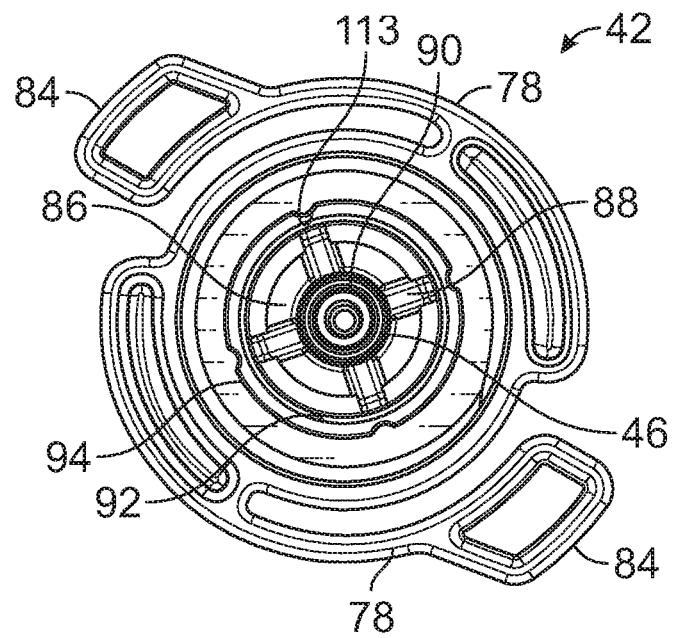
FIG. 9 is a bottom plan view of the base of FIG. 8.
Figure 10:
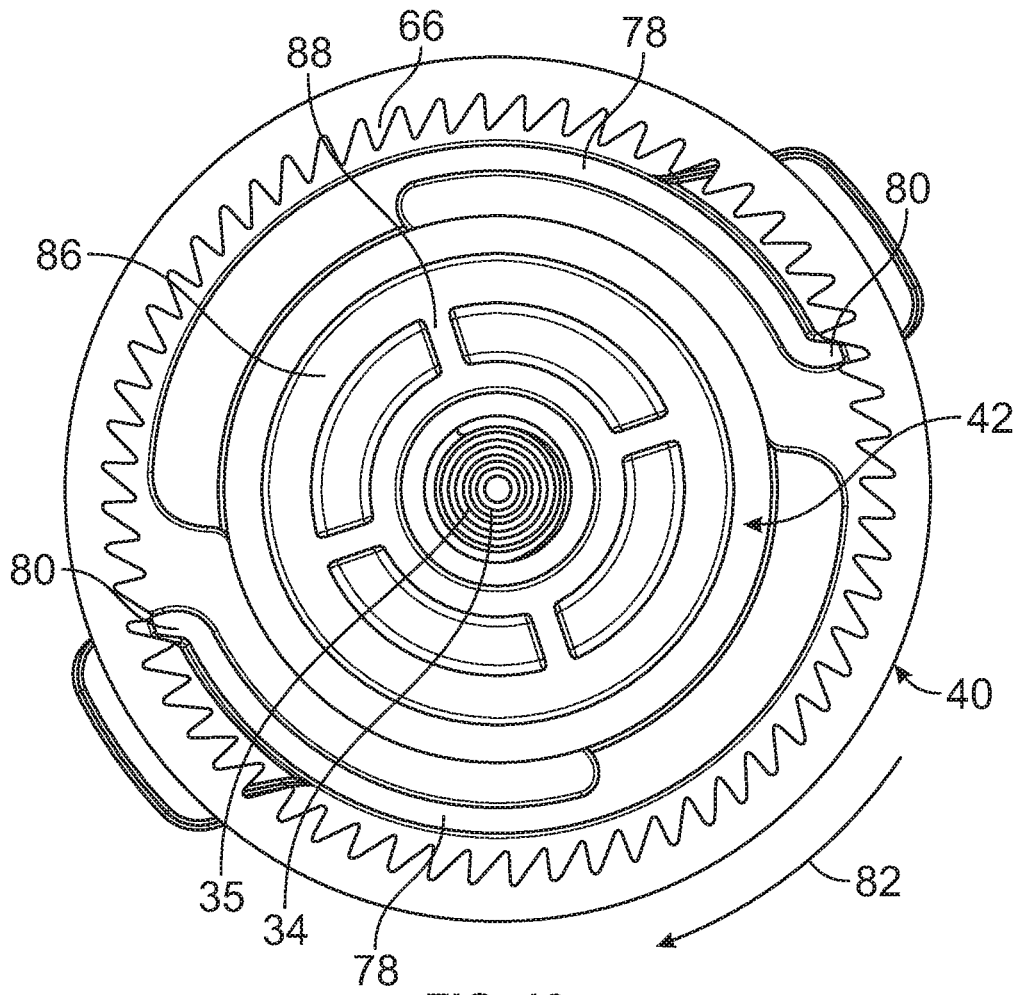
FIG. 10 is a cross-section view of the adapter of the solenoid valve of FIG. 1 taken along line 10-10 of FIG. 1.
Figure 11:
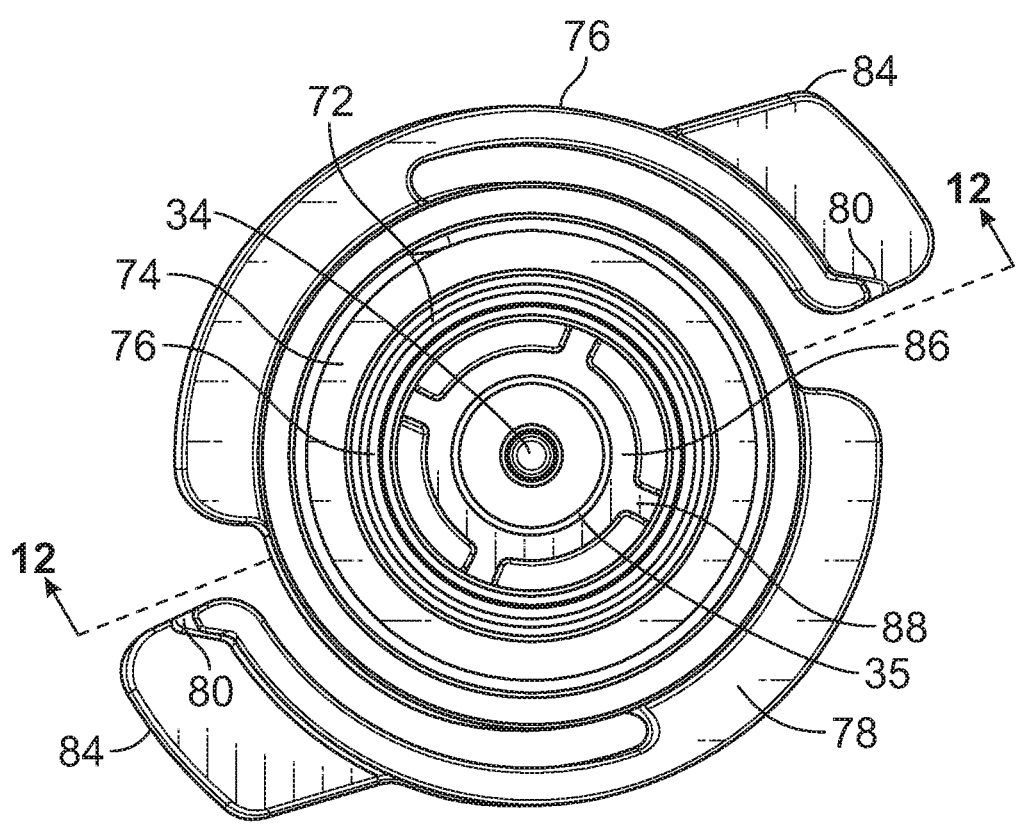
FIG. 11 is a top plan view of the base of FIG. 8.
Figure 12:
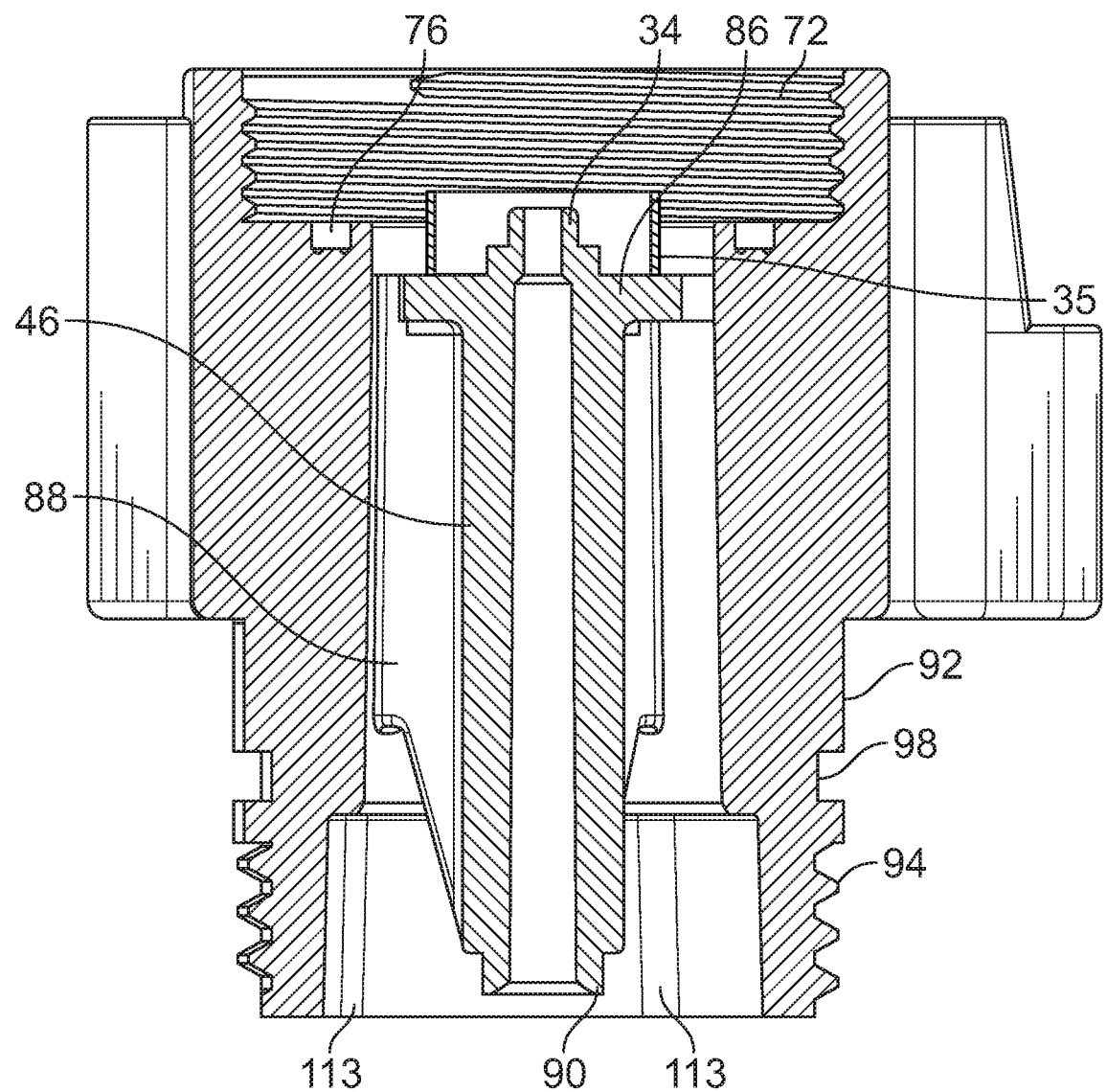
FIG. 12 is a cross-section view of the base of FIG. 8 taken along line 12-12 of FIG. 11.
Figure 13:
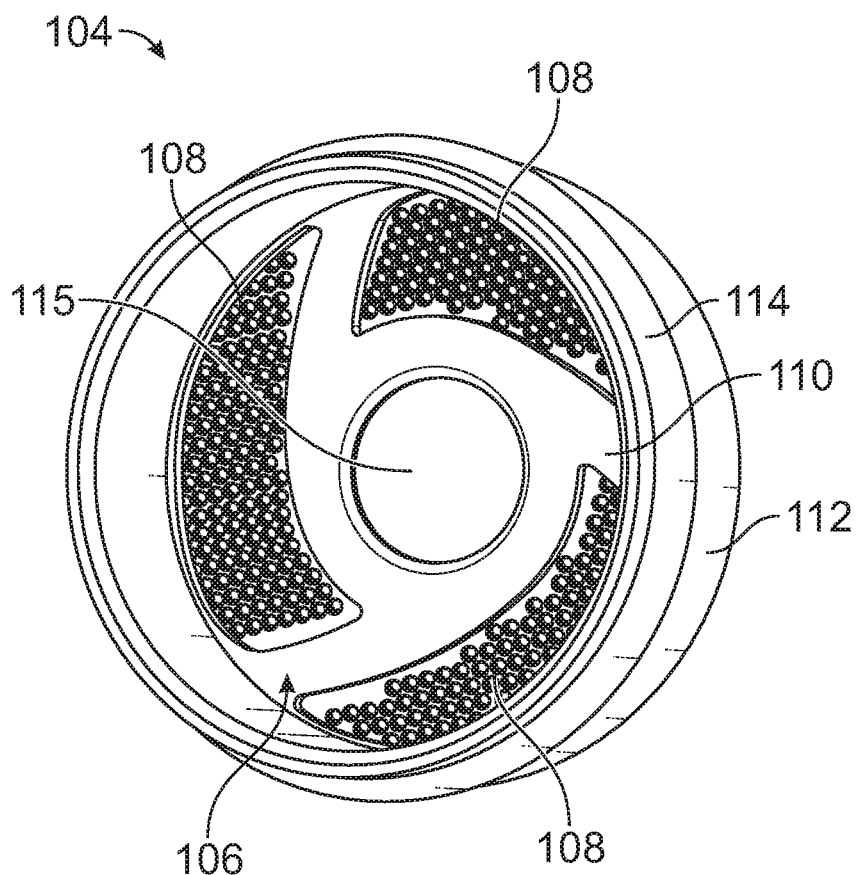
FIG. 13 is a top perspective view of a filter of the solenoid valve of FIG. 1.
Figure 14:
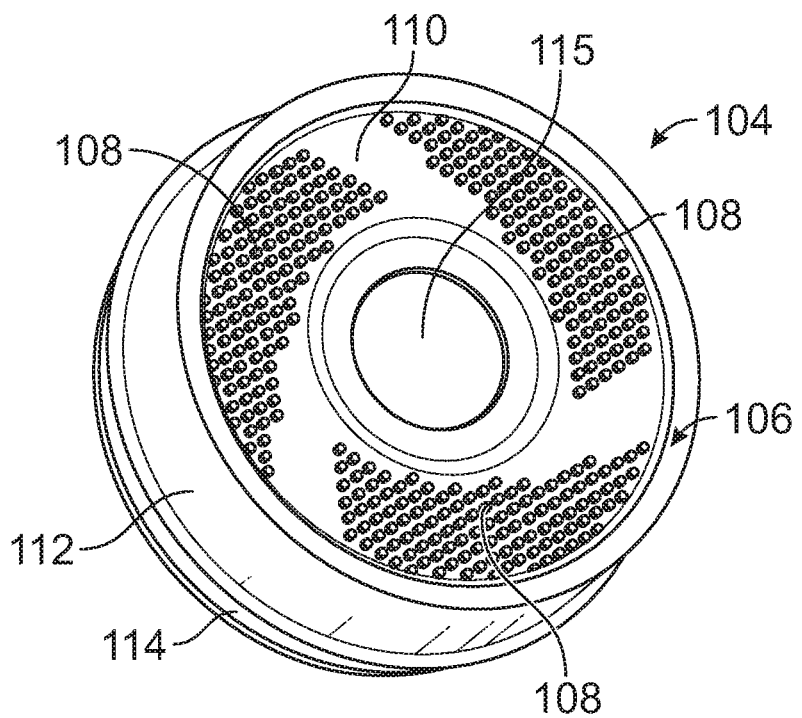
FIG. 14 is a bottom perspective view of the filter of FIG. 13.
Figure 15:
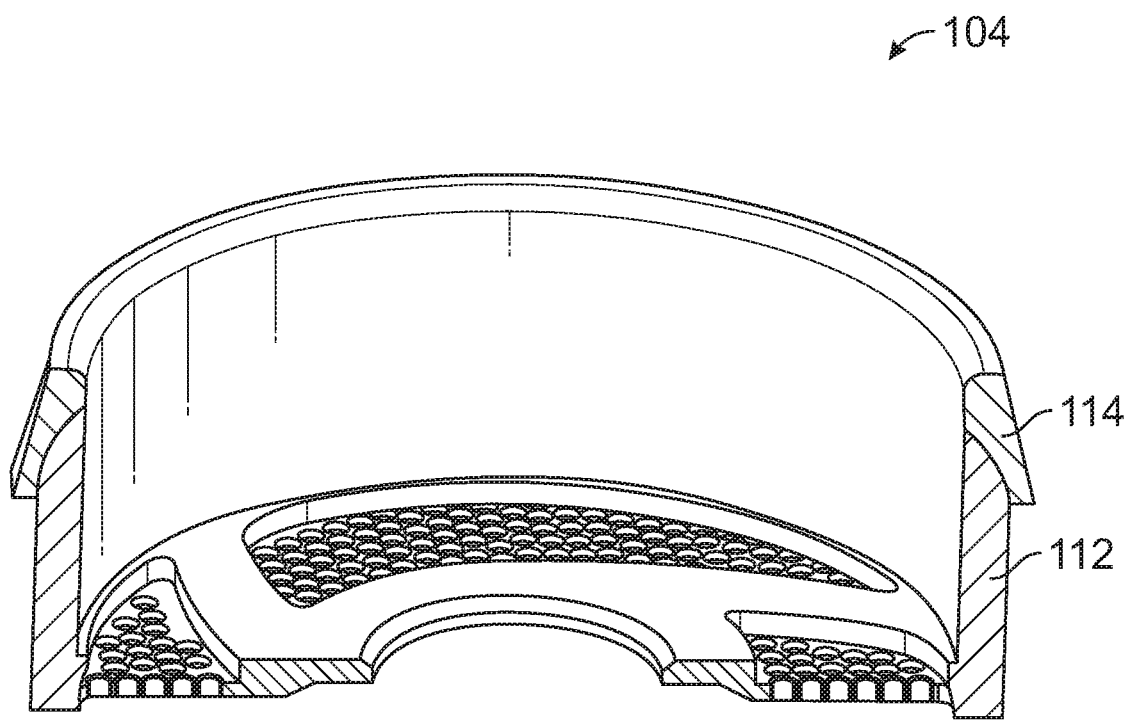
FIG. 15 is a centrally taken cross-section view of the filter of FIG. 13.

As illustrated in FIGS. 5-7, the lock ring 40 includes a perimeter wall 50 defining a recess 52 that receives a base portion 54 of the solenoid 30 (FIG. 4). The path of the wall 50 complements the outer profile of the base portion 54 of the solenoid 30. The wall 50 includes a pair of fingers 56 with hooks 58 to secure the lock ring 40 to the base portion of the solenoid 30 so that it remains attached to the solenoid 30. The base portion 54 includes a pair of radial edges 60 that the hooks 58 grab onto to secure the lock ring 40 to the solenoid 30. The fingers 56 are connected to the wall 50 with reduced thickness sections 62 of the wall 50 so that the fingers 56 can flex outward to engage the edges 60. To further assist with engagement of the edges, each of the hooks 58 include an angled cam surface 64 that slides over the edges 60 to force the fingers 56 outward until the hook 58 passes the edge 60 and snaps back into place. Since the wall 50 and outer profile of the base portion 54 are not circular, the lock ring 40 will turn with the solenoid 30.

The opposite side of the lock ring 40 includes an annular array of teeth 66. The teeth 66 are angled in a clockwise direction when viewing the lock ring 40 from the bottom (FIG. 7). The teeth 66 form a ratchet locking mechanism with the base 42 as described further below. The locking ring 40 defines a center opening 68 through which an externally threaded mount 70 for the solenoid 30 extends to attach to the base 42.

With reference to FIGS. 8-12, the base 42 defines an internally threaded socket 72 for receiving the externally threaded mount 70 in a threaded fashion. The socket 72 includes an annular bottom 74 defining an annular recess 76 that receives the O-ring 44 to create the face seal with the externally threaded mount 70 of the solenoid 30. The base 42 includes two diametrically opposed arcuate arms or pawls 78 that each terminate with a vane 80. The arms 78 are flexible to move outward and include memory due to the material to move inward to rachet over and follow the teeth 66 of the lock ring 40 when threading the threaded mount 70 of the solenoid 30 into the internally threaded socket 72. The teeth 66 are angled away from the direction of rotation of the solenoid 30 when threading the threaded mount 20 into the threaded socket 72. The direction of rotation of the solenoid is indicated by reference number 82 (counterclockwise, FIG. 10). Thus, the teeth 66 angle in the opposite direction to prevent rotation that would separate the base 42 from the solenoid 30. The vanes 80 can be released from the teeth 66 by pressing the arms 78 inward and turning the solenoid 30 out of the threaded socket 72. Each arm 78 includes an enlarged end 84 to provide a large surface to manually engage to aid in this disengagement.

Figure 3:
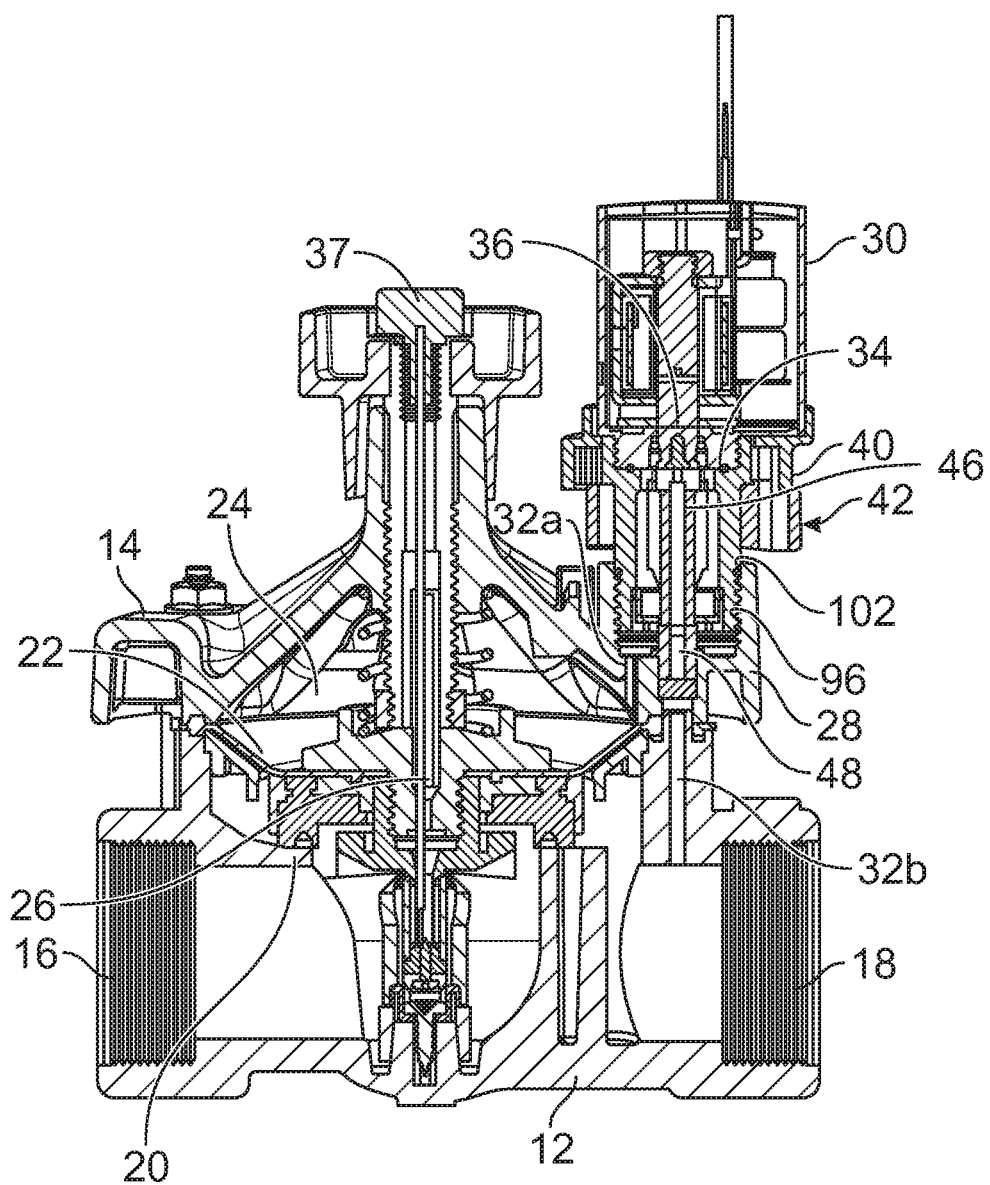
FIG. 3 is a cross-section view of the solenoid valve of FIG. 1 taken along line 3-3 of FIG. 2.

The base 42 includes a boss 86 at its center supported by spokes 88. The boss 42 defines the plunger passage 46 that extends axially through the base 42. The inlet end of the plunger passage 46 is the secondary valve seat 34 and an outlet end 90 connects with secondary inlet 48 of the vent passage 32*b*. The base 42 further includes a cylindrical column 92 that has external threading 94 to engage internal threading 96 in the solenoid socket 28 of the bonnet 14 (FIGS. 3 and 4).

The locking engagement between the base 42 and the locking ring 40 allows rotation of the solenoid 30 to transfer the movement to the threading 94, 96 between the base 42 and the solenoid socket 28 of the bonnet 14. Therefore, turning the solenoid 30 in the counterclockwise direction creates a separation between the plunger passage 46 and the secondary inlet 48 to the vent passage 32*b*. This results in manual bleeding of the pressure chamber 24 and opening of the solenoid valve 10 by allowing the diaphragm 22 to move off the primary valve seat 20. Rotation of the solenoid 30 in the clockwise direction rotates both the base 42 and the lock ring 40 due to the solenoid 30 being fully threaded into the base 42 and/or being bottomed out in the base 42, thereby providing a mechanical stop between base 42 and the solenoid 30.

The base 42 may include an annular wall or rib 25 disposed concentrically around the secondary valve seat 34. The annular wall 35 aids in preventing the plunger 36 from becoming stuck in the open position relative to the valve seat 34. If the plunger 36 becomes stuck in the open position the valve 10 will not operate properly (that is, it will remain in an ON state). The annular wall 35 eliminates a direct path from first segment 32*a* of the vent passage 32 to the second segment 32*b* of the vent passage 32 on the downstream side of the secondary valve seat 34. For example, during normal operation, the low pressure side of the valve 10 is the downstream side, so when the secondary valve seat 34 is opened, the pressure chamber 24 vents fluid through the vent passage 32 to the downstream side of the valve 10. However, if the chamber 24 is bled to atmosphere using the bleed screw 37 on the bonnet of the valve 10, then there will be potential for a low pressure situation created in the chamber 24, which could result in fluid traveling in a reverse direction through the vent path. This may cause upward pressure on the plunger 36 causing it to move too far upward in the solenoid 30 and become jammed or grabbed by a magnet in a DC latching type solenoid. The annular wall 35 has been found to prevent this undesired result by creating a tortuous segment between the first and second segments 32*a*, 32*b* of the vent passage 32.

The column 92 of the base 42 defines an annular recess 98 that captivates a seal 100, such as an O-ring (FIG. 4). The seal 100 engages a smooth wall portion 102 of the solenoid socket 28 to provide a radial seal between the base 42 and the solenoid socket 28. As the base 42 turns and moves axially in the solenoid socket 28 during the manual bleeding process, the seal 100 slides on the smooth wall portion 102 and does not prematurely lose its sealing function as a result of this movement. This results in a clean separation of the adapter 38 and secondary inlet 48 of the vent passage 32*a* to allow the valve 10 to open without any potential leaking to the outside of the valve 10 due to the radial seal 100 of the adapter 38 to the solenoid socket 28.

As shown in FIGS. 3 and 13-15, a filter 104 is installed in the column 92 of the base 42. The filter 104 includes a bottom 106 with a mesh like structures 108 and support webbing 110. The filter 104 also includes an annular side wall 112 that projects from a perimeter of the bottom 106. An annular barb 114 extends radially outward from the annular side wall 112. The barb 114 grips the inner surface of the column 92 to hold the filter 104 in the column 92. The inner surface of the column 92 includes axially extending ribs 113 that are engaged by the barbs 114. The bottom 106 defines a central passage 115 through which the plunger passage 46 extends with a tight fit to prevent unfiltered water from passing therethrough.

Figure 16:
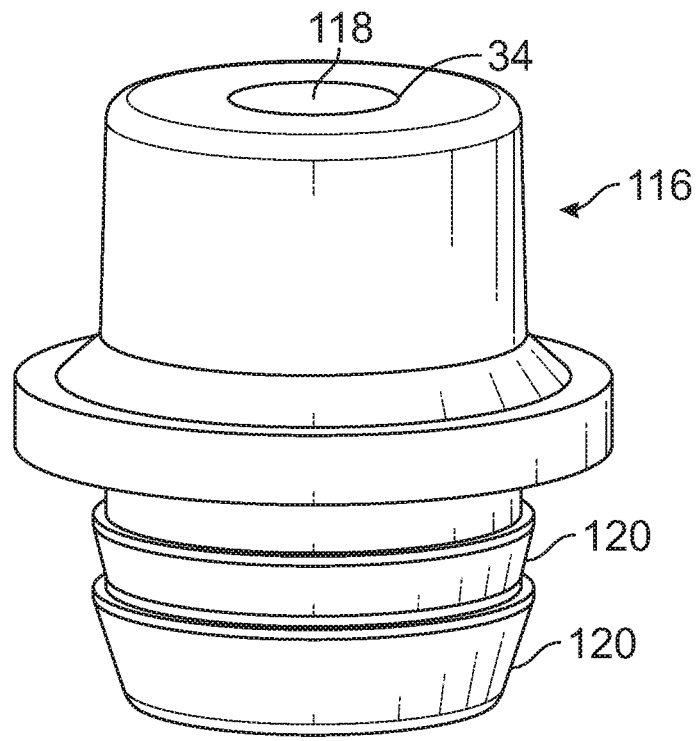
FIG. 16 is a side perspective view of an insert of the solenoid valve of FIG. 1.

Referring to FIG. 16, the inlet to the vent passage 32b includes an insert 116. The insert 116 includes a passage 118 for fluid and at least one annular barb 120 that engages the inner surface of the vent passage 32b to hold the insert 116 in place (FIG. 3). As illustrated, there may be two barbs 120 in series. The outlet end 90 of the plunger passage 46 connects with the passage 118 of the insert 116 and disconnects with the passage 116 during manual bleeding. An inlet end of the passage 118 is the secondary valve seat 34.

The base and the locking ring of the adapter may be made from acetal, such as DuPont® Delrin® acetal homopolymer resin or Celcon® acetal copolymer grade M90 available from Celanese Corporation. Other materials that are capable of the functions described above for these components also may be used for these components.

The matter set forth in the foregoing description and accompanying drawings is offered by way of example and illustration only and not as a limitation. While certain embodiments have been shown and described, it will be apparent to those skilled in the art that additions, changes and modifications may be made without departing from the broader aspects of the technological contribution. The actual scope of the protection sought is intended to be defined in the following claims.

What is claimed is:

1. An adapter for a solenoid of a solenoid actuated valve comprising:
    a base providing at least one locking pawl, the at least one locking pawl having a fixed end and a radially moveable end;
    a lock ring providing a series of teeth forming a one-way locking ratchet with the radially moveable end of the locking pawl;
    a radial seal affixed to the base; and
    wherein the base defines a vent passage that includes an inlet segment, an outlet segment and wall at least partially separating the inlet segment and the outlet segment.

2. The adapter of claim 1 further comprising a radial seal about a portion of the base.

3. The adapter of claim 2 further comprising an end face seal.

4. The adapter of claim 1 wherein the at least one locking pawl includes at least two locking pawls.

5. The adapter of claim 4 wherein the at least two locking pawls are arcuate.

6. An adapter for a solenoid of a solenoid actuated valve comprising:
    a base providing at least one locking pawl;
    a lock ring providing a series of teeth forming a one-way locking ratchet with the locking pawl;
    a radial seal affixed to the base; and
    the at least one locking pawl is positioned inside the locking ring to engage the series of teeth.

* * * * *